United States Patent
Ruetschi et al.

(10) Patent No.: US 8,184,796 B2
(45) Date of Patent: May 22, 2012

(54) PRIVATE COMMUNICATIONS NETWORK WITH WILDCARD DIALING

(75) Inventors: Johannes Ruetschi, Boca Raton, FL (US); Joseph LoBuono, Delray Beach, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1636 days.

(21) Appl. No.: 11/488,714

(22) Filed: Jul. 18, 2006

(65) Prior Publication Data

US 2008/0043972 A1 Feb. 21, 2008

(51) Int. Cl.
*H04M 3/42* (2006.01)
(52) U.S. Cl. .............. 379/216.01; 379/202.01
(58) Field of Classification Search ........... 379/211.01, 379/216.01, 202.01; 370/352
See application file for complete search history.

(56) References Cited

U.S. PATENT DOCUMENTS

| | | | | |
|---|---|---|---|---|
| 4,259,549 A * | 3/1981 | Stehman | ........... | 379/204.01 |
| 5,465,295 A * | 11/1995 | Furman | ........... | 379/221.14 |
| 5,583,925 A * | 12/1996 | Bernstein | ........... | 379/202.01 |
| 6,275,574 B1 * | 8/2001 | Oran | ........... | 379/201.01 |
| 2003/0031179 A1 * | 2/2003 | Oh | ........... | 370/392 |
| 2007/0121602 A1 * | 5/2007 | Sin et al. | ........... | 370/356 |
| 2009/0016519 A1 * | 1/2009 | Bedingfield et al. | ........... | 379/216.01 |

FOREIGN PATENT DOCUMENTS

| RU | 2184395 C2 | 8/2002 |
|---|---|---|
| WO | 9427160 A1 | 11/1994 |

* cited by examiner

*Primary Examiner* — Ahmad Matar
*Assistant Examiner* — Oleg Asanbayev

(57) ABSTRACT

A private communications network and method of managing calls in a private communications network. Connected communications devices register with the network and are assigned aliases, with aliases for groups of registered devices sharing one or more common digits. Dialing strings for in-network calls are monitored for inclusion of a wildcard (e.g., *) which are treated as a "don't care." The wildcard invokes group features, such as placing a conference call, invoking a hunting feature and invoking a pickup feature. The call is distributed/connected to the group corresponding to the remaining digits.

19 Claims, 2 Drawing Sheets

PRIVATE COMMUNICATIONS NETWORK WITH WILDCARD DIALING

BACKGROUND OF THE INVENTION

1. Field of the Invention

The present invention is related to private communications networks and more particularly, to providing group features in a private communications network.

2. Background Description

A private communications network, such as a private voice network, is a full featured local telephone network. A typical private communications network may include, for example, a communications server or private branch exchange (PBX) server linking together wire connected digital phones for a particular enterprise, e.g., phones located in offices on a common campus. The digital phones may be cordless to allow some mobility within a specific local area and sometimes are Internet protocol (IP) based for easy expansion, e.g., simply by connecting extra IP phones. Local users can share both data and voice based information across the private network to improve productivity. Thus, such a private communications network provides user mobility and easy access for telecommuting, as well as low cost from using fewer external lines.

In a typical such private communications system or IP based network, a digit string or number is associated with each specific system station. Phones at some stations may have a direct line with a dial in direct (DID) number and others may be accessible as extensions from a main number or switchboard number. The main number may be answered by a voice menu or receptionist. Each station has its own unique identification on the network, i.e., its own in-network phone number or alias. Point to point calling within the network is normally done by dialing an abbreviated number string, one to five digits long, i.e., the particular alias.

Typical aliases have additional numbers/characters that can uniquely be associated with a particular user station. Normally, such an IP based network also has pilot numbers for group features such as hunting or pickup. These pilot numbers are normally statically configured through administration. Other features that typically have statically configured pilot numbers include, for example, meet conference bridges.

Arranging a conference call in such a communications system, for example, may be a complicated process. Someone may have to call all of the conferees to arrange a contact time. Then, when that time arrives, all of the conferees must call the selected pilot number. If one conferee happens to forget, someone else is sent to find the missing party.

Thus, there is a need for expanding and simplifying the use of group connection features in private communications networks.

SUMMARY OF THE INVENTION

It is a purpose of the invention to expand the use of group connection features of private communications networks.

It is another purpose of the invention to simplify using group connection features of private communications networks.

The present invention relates to a private communications network and method of managing calls in a private communications network. Connected communications devices register with the network and are assigned aliases, with aliases for groups of registered devices sharing one or more common digits. Dialing strings for in-network calls are monitored for inclusion of a wildcard (e.g., *) which are treated as a "don't care." The wildcard invokes group features, such as placing a conference call, invoking a hunting feature and invoking a pickup feature. The call is distributed/connected to the group corresponding to the remaining digits.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
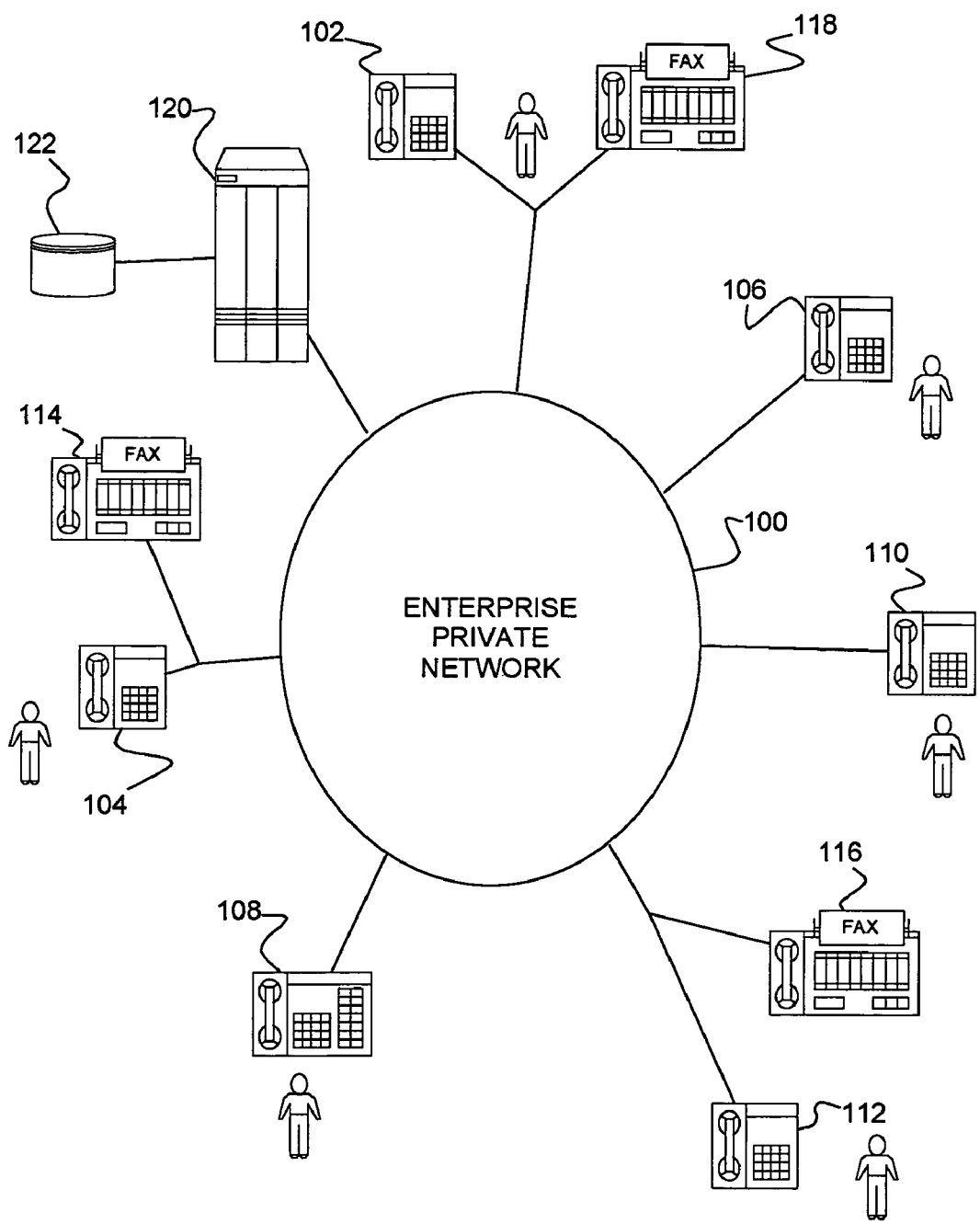
FIG. 1 shows an example of a preferred embodiment private communications network or an Enterprise Private Network (EPN), that allows users to substitute pre-selected keys as wildcards for shortcut dialing according to a preferred embodiment of the present invention.

Turning now to the drawings and more particularly, FIG. 1 shows an example of a preferred embodiment private communications network or an Enterprise Private Network (EPN) 100, that allows users to substitute pre-selected keys (e.g., *, #, alone or in combination with each other or in combination with numeric keys) as wildcards for shortcut dialing according to a preferred embodiment of the present invention. Groups of users are assigned aliases with one or common digits in corresponding locations. The wildcard is treated as a "don't care." The EPN 100 may be connected to a public network (not shown) for external communications. Preferably, the EPN is a digital telecommunications network and, more preferably, an Internet protocol (IP) based or Session Initiation Protocol (SIP) based network.

The EPN 100 includes a number of stations each identified by an unique private network identification (ID) code and with one or more appropriate attached digital communications (or user) devices 102, 104, 106, 108, 110, 112, 114, 116, 118 at each station. The digital communications devices 102, 104, 106, 108, 110, 112, 114, 116, 118 communicate with each other and with other communications devices at other stations and externally, e.g., with the public telephone network. In this example, user devices 102, 104, 106, 108, 110, 112 are digital telephones and user devices 114, 116, 118, are other digital communications devices, e.g., fax machines. Also, the EPN 100 includes one or more communications network servers 120, e.g., a private branch exchange (PBX), SIP server and/or a mobility server, managing private communications over the EPN 100. The EPN 100 also includes a group membership registry 122, e.g., a table on one of the servers 120.

Each user may implicitly be part of a group with the assignment of an alias or, alternately, register for one or more groups with the system, e.g., with the (SIP) or the mobility server, and group features may be made available to identified groups of registered users. Each registered user is assigned one or more alias for each respective digital communications device 102, 104, 106, 108, 110, 112, 114, 116, 118 with aliases for groups of registered devices sharing one or more common digits. Further, user may have numbers (or aliases) that are associated with one or more groups. The (SIP) or the mobility server maps registered user numbers to a particular organizational or functional business structure. Thereafter, registered users can dynamically invoke group features using wildcard dialing. By substituting a single wildcard character (e.g., the star (*) key, non dialable digits, and with pre-programmed rep-dial/function keys) in combination with pre-selected keys group features are invoked and, in effect, calls are broadcast to selected users based on the specific combination. Group features may include, for example, hunt, pickup, and/or conference. Each feature can be flexibly invoked with minimal static administration overhead.

So, for the example of FIG. 1, the devices 102, 104, 106, 108, 110, 112 may be assigned to users in two sales groups, one and two, with each group having a supervisor and two employees. Table 1 shows an alias assignment for this example for a dial plan for selectively using wildcard dialing according to a preferred embodiment of the present invention.

TABLE 1

| Organizational Unit | Subscriber | Station | Extension |
| --- | --- | --- | --- |
| Sales 1 | Supervisor 1 | 102 | 2010 |
|  | Employee 11 | 104 | 2011 |
|  | Employee 12 | 106 | 2012 |
| Sales 2 | Supervisor 2 | 108 | 2020 |
|  | Employee 21 | 110 | 2021 |
|  | Employee 22 | 112 | 2022 |

Wildcard dialing may be effected by strategically placing an escape digit (e.g., *) in the dialing stream accompanied by a designator digit that designates the particular feature being invoked. So, for example, a conference call may be invoked by *c (*2), hunting may be invoked by *h (*4) and pickup is invoked by *p (*7). So, for the four digit aliases of this example, all six aliases have the first two digits (20) in common and each group also shares the third number (1 or 2) in common. Dialed numbers are treated normally and, whenever the wildcard is included in a dialed number, the wildcard is treated as a "don't care" and invokes the same group feature for all corresponding aliases. So, for example, a conference with all members of Sales group 1 may be invoked by dialing 201*c. As a shortcut for reaching anyone in Sales group 2, hunting aliases for that group may be invoked by dialing 202*h. Similarly, anyone in Sales group 1 may be designated for pickup by dialing 201*p. Any sales supervisor (i.e., group leader) can be contacted by dialing 20*h0. Similarly, any sales employee can be contacted by dialing 20*h. Also, multiple wildcards may be used in the same dialing string to broaden the selected group. It should be noted that these sales group examples are for example only and not intended as a limitation.

Figure 2:
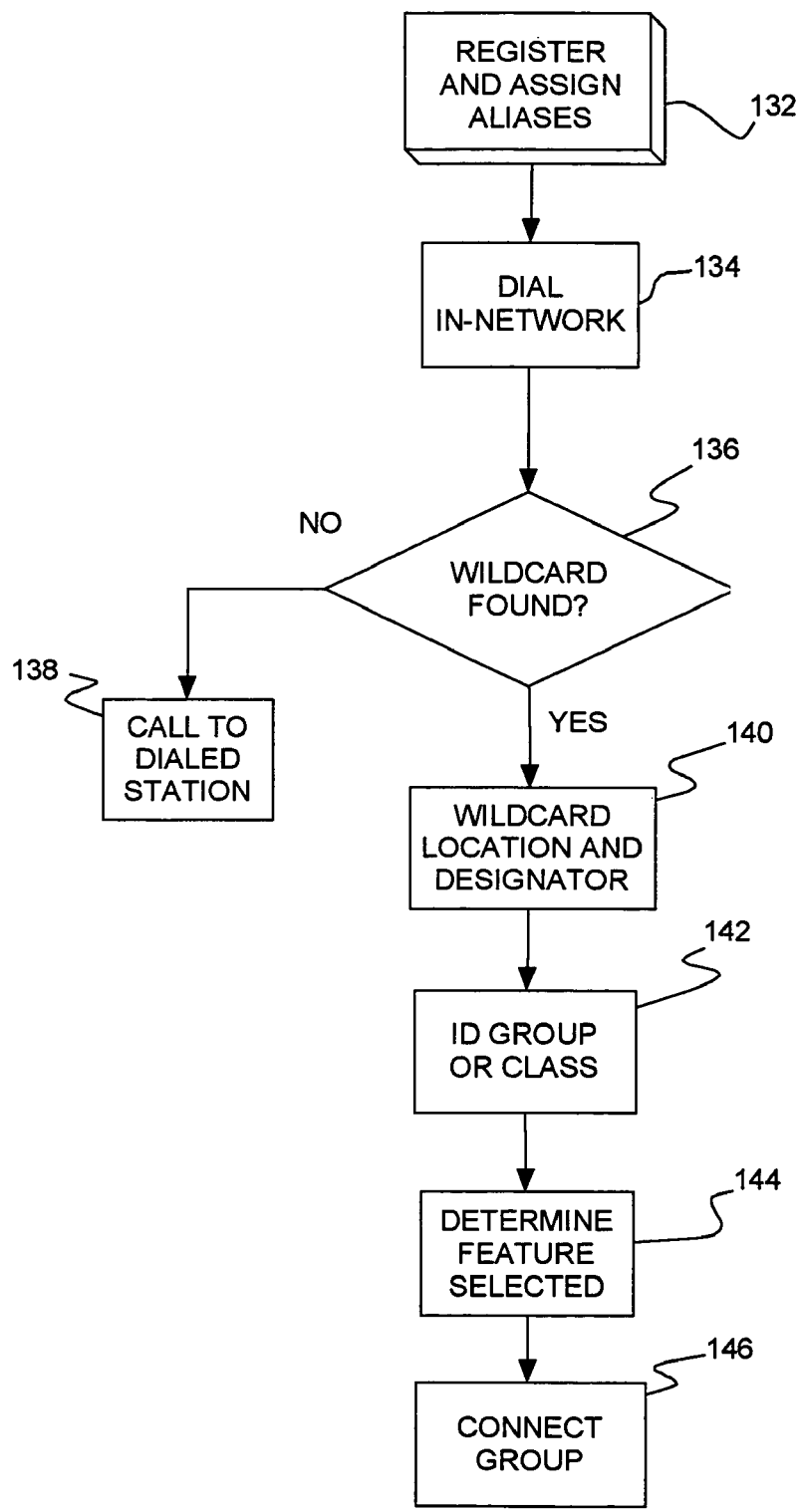
FIG. 2 shows an example of a method of managing calls between EPN stations enabled for wildcard dialing.

FIG. 2 shows an example of a method of managing calls between stations in an EPN enabled for wildcard dialing according to a preferred embodiment of the present invention with reference to the example of FIG. 1. In step 132 each digital communications device 102, 104, 106, 108, 110, 112, 114, 116, 118 registers with the system and, the system assigns one or more user numbers/aliases with to each registered station. In step 134 a local number (e.g., at least 4 digits) is dialed. In step 136 the dialed number is checked for a wildcard and, if none is found, in step 138 the call continues normally. Otherwise, in step 140 the location of the wildcard in the dialed number and any following digit designating the selected feature is noted, e.g., in location 3 or 4 and followed by *c, *h or *p. Then, depending upon the location of the wildcard, in step 142 the selected group (e.g., sales group 1 identified by 201 or sales group 2 identified by 202) or class (e.g., supervisors or employees identified by the final digit) of users is identified. Next, in step 144 the feature selected (e.g., *c, *h or *p) for the group/class is determined for the selected group or class. Finally, in step 146 the call is completed in accordance with the selected feature.

Thus, the present invention provides enterprise system users have useful shortcuts that can allow each user to selectively contact groups of other users with dialing a single number. Conference calls, for example are simply arranged by allowing a user to avoid entering each of a number of aliases or having users individually connect and instead, a single party can contact all conferees and arrange the conference call by dialing a single number.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A private communications network comprising:
   a plurality of communications devices at private communications network stations, at least one of said plurality of communications devices being a digital telephone;
   a group membership registry listing aliases registered for said plurality of communications devices and comprising at least one group of a plurality of said aliases, each of the aliases within a group of aliases being different than other aliases in that group, each alias of the aliases comprising a plurality of numerical digits, a selected wildcard in a dialed number being treated as a "don't care" for dialing such that all communications devices with aliases that comprise a string of numerical digits that match the dialed number preceding the wildcard are identified as group members within one of the at least one group of aliases, said wildcard being a non-numerical symbol key substituted for one or more digits of the dialed number used for initiating a call; and
   at least one communications server monitoring said plurality of communications devices for inclusion of the wildcard in the dialed number used for initiating the call and responsive to encountering said wildcard by providing a group feature for the call, the group feature involving the communications devices having aliases within the one of the at least one group of aliases in the call.

2. The private communications network as in claim 1, wherein the wildcard is a star (*) symbol.

3. The private communications network as in claim 1, wherein the group feature is one of: a conference call, a hunting feature and a pickup feature.

4. The private communications network as in claim 1, wherein said group feature is invoked by one of entering *c for a conference call, entering *h for hunting and entering *p for pickup.

5. A method of managing private network calls, said method comprising the steps of:
   a) monitoring dialing strings for in-network calls;
   b) identifying any dialed strings including a wildcard substituted for a number in one or more string locations, said wildcard being a non-numerical symbol key;
   c) identifying a group of communications devices associated with each identified dialed string according to numbers in remaining string locations in that identified dialed string for an in-network call, at least one of the communications devices being a digital telephone, the group comprising devices identified by aliases, the aliases comprising a plurality of numerical digits, each said wildcard being treated as a "don't care" for dialing such that all communications devices with aliases that comprise a string of numerical digits that match a dialed string preceding the wildcard are identified as group members of the group; and d) selectively connecting an originating communications device to the communications devices in said group.

6. The method of managing private network calls as in claim 5, wherein a plurality of communications devices in the network each have a unique multi-digit identification (ID) number, ID numbers for group member communication devices having one or more digits in common, each communications device in an identified group being identified by unique digits in remaining ID number locations preceding the wildcard in the identified dialed string.

7. The method of managing private network calls as in claim 5, wherein said wildcard is a star (*) symbol of a star key of a communication device.

8. The method of managing private network calls as in claim 5, wherein said wildcard initiates invoking a group feature for the call, said call being connected according to the group feature.

9. The method of managing private network calls as in claim 8, wherein said group feature comprises one of a conference call, a hunting feature and a pickup feature.

10. The method of managing private network calls as in claim 8 wherein said wildcard is a star (*) inputted via a star (*) key on a telephone and said group feature is invoked by one of: entering *c for a conference call, entering *h for hunting, and entering *p for pickup.

11. The method of managing private network calls as in claim 8, wherein calls placed with dialing strings identified as not including wildcards are placed normally.

12. The method of managing private network calls as in claim 5, wherein before the step (a) of monitoring dialing strings, said method comprises:

a1) registering communications devices with said private network; and a2) assigning the aliases to groups of said registered communication devices, the aliases for each group sharing one or more common digits.

13. A method of managing private network calls, said method comprising the steps of:

a) registering communications devices with said private network, at least one of the communications devices being a digital telephone;

b) assigning aliases to groups of registered said communications devices, aliases for each group sharing one or more common digits in individual communications device aliases and identified individually by one or more unique digits within a respective group;

c) monitoring dialing strings for in-network calls;

d) identifying any dialed strings including a wildcard substituted for numbers in one or more string locations, said wildcard being a non-numerical symbol key substituted for one or more digits of a dialed number used for initiating a call, the wildcard being treated as a "don't care" in said each identified dialed string;

e) identifying one of said groups as being associated with a portion of the numbers dialed in each identified dialed string such that all communications devices with aliases that comprise a string of numerical digits that match the dialed number preceding the wildcard are identified as group members within one of said groups of aliases; and f) selectively connecting an originating communications device to the communications devices in said one of said groups.

14. The method of managing private network calls as in claim 13, wherein said wildcard initiates invoking of a group feature for a corresponding call, said call being selectively connected responsive to the invoked group feature.

15. The method of managing private network calls as in claim 14, wherein said wildcard is a star (*) in a respective dialing string.

16. The method of managing private network calls as in claim 15, wherein said group feature is one of a conference call, a hunting feature and a pickup feature.

17. The method of managing private network calls as in claim 16, wherein the group feature is invoked by one of entering *c for a conference call, entering *h for hunting and entering *p for pickup.

18. The method of managing private network calls as in claim 13, wherein calls placed with dialing strings identified as not including wildcards are placed normally.

19. The method of claim 13 wherein said wildcard is a star (*).

* * * * *